United States Patent
Spillane et al.

(10) Patent No.: US 9,645,946 B2
(45) Date of Patent: May 9, 2017

(54) ENCRYPTION FOR SOLID STATE DRIVES (SSDS)

(71) Applicant: Apple Inc., Cupertino, CA (US)

(72) Inventors: Richard Paul Spillane, Mountain View, CA (US); Wenguang Wang, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 201 days.

(21) Appl. No.: 14/500,943

(22) Filed: Sep. 29, 2014

(65) Prior Publication Data

US 2015/0347320 A1 Dec. 3, 2015

Related U.S. Application Data

(60) Provisional application No. 62/005,785, filed on May 30, 2014.

(51) Int. Cl.
| | |
|---|---|
| *G06F 21/79* | (2013.01) |
| *G06F 12/14* | (2006.01) |
| *G06F 21/78* | (2013.01) |
| *G06F 12/02* | (2006.01) |

(52) U.S. Cl.
CPC ...... *G06F 12/1408* (2013.01); *G06F 12/0246* (2013.01); *G06F 21/78* (2013.01); *G06F 21/79* (2013.01); *G06F 2212/1052* (2013.01); *G06F 2212/214* (2013.01); *G06F 2212/402* (2013.01); *G06F 2212/7201* (2013.01); *G06F 2212/7205* (2013.01)

(58) Field of Classification Search
CPC .. G06F 12/0246; G06F 12/1408; G06F 21/78; G06F 21/79; G06F 2212/1052; G06F 2212/214; G06F 2212/402; G06F 2212/7201; G06F 2212/7205

See application file for complete search history.

(56) References Cited

U.S. PATENT DOCUMENTS

| | | | | |
|---|---|---|---|---|
| 8,345,876 | B1* | 1/2013 | Sinn | H04L 9/0656 380/255 |
| 8,675,868 | B1* | 3/2014 | Yearsley | G06F 12/1408 380/29 |
| 2007/0086260 | A1* | 4/2007 | Sinclair | G06F 12/0246 365/230.03 |
| 2009/0196414 | A1* | 8/2009 | Mittal | H04L 9/06 380/28 |
| 2009/0327759 | A1* | 12/2009 | Royer | G06F 11/1441 713/193 |
| 2011/0060915 | A1* | 3/2011 | Tal | G06F 21/6218 713/189 |
| 2011/0208979 | A1* | 8/2011 | Saarinehn | G06F 21/78 713/193 |

(Continued)

*Primary Examiner* — Theodore C Parsons
(74) *Attorney, Agent, or Firm* — Downey Brand LLP

(57) ABSTRACT

Disclosed herein are techniques for encrypting data stored on a solid-state drive (SSD) managed by a system (e.g., a computing device). Specifically, the system is configured to track block units of a larger size on the SSD so that a mapping table associated with the SSD can be kept small. After running SSD encryption using the large size block units, the entire SSD can be fully encrypted without requiring clear text to be written onto the SSD subsequent to SSD encryption being activated. Thereafter, the entire SSD can be defragmented to produce a single physical extent of encrypted data.

20 Claims, 21 Drawing Sheets

(56) References Cited

U.S. PATENT DOCUMENTS

| | | | |
|---|---|---|---|
| 2013/0054979 A1* | 2/2013 | Basmov | G06F 21/602 713/193 |
| 2014/0075098 A1* | 3/2014 | Uno | G06F 12/0246 711/103 |
| 2015/0121088 A1* | 4/2015 | Baryudin | G06F 12/1408 713/193 |
| 2015/0301964 A1* | 10/2015 | Brinicombe | G06F 13/28 710/308 |

* cited by examiner

ENCRYPTION FOR SOLID STATE DRIVES (SSDS)

CROSS-REFERENCE TO RELATED APPLICATIONS

The present application claims the benefit of U.S. Provisional Application No. 62/005,785, entitled "ENCRYPTION FOR SSD" filed May 30, 2014, the content of which is incorporated herein by reference in its entirety for all purposes.

FIELD

The described embodiments relate generally to methods and systems for encryption of data stored on a solid-state drive (SSD), and, more particularly, to methods and systems for optimizing the encryption of data stored on the SSD.

BACKGROUND

Encryption can be applied to data stored on an SSD (solid-state drive). When encryption is activated for data storage on the SSD, the data that is to be written onto the SSD is encrypted, and the encrypted data is written onto the SSD. In other words, when encryption is enabled, all data is encrypted before being written onto the SSD. In some cases, when a user starts using a system, the SSD on the system can contain unencrypted data. In this scenario, some regions of the SSD (referred to as "unencrypted regions") might contain unencrypted data, while other regions of the SSD (referred to as "encrypted regions") might contain encrypted data. When data is written onto the unencrypted regions of the SSD, the data is written as clear text, which is unencrypted. Conversely, when data is written onto the encrypted regions of the SSD, the data is written as encrypted data.

A problem can occur when clear text is written on the SSD, because the clear text might remain hidden on the SSD for an indefinite period of time. In other words, the clear text might not get overwritten even after all other data in the SSD has been encrypted on a logical level. In some cases, the indefinite period of time can be a few days, a few months, or even a few years. Because an actual physical size of the SSD can be larger than its logical size, the SSD can have space where the clear text is written to and remains hidden. In some embodiments, the unencrypted clear text can remain "hidden" when stored in a special region used for a mapping table that maps the logical volume to the physical volume. Notably, this situation can present a security problem. Specifically, if the system with the "encrypted" SSD gets stolen, an unauthorized third party might be able to remove the physical SSD chip from the system and extract the unencrypted clear text. In other words, when the system has written unencrypted clear text on the SSD, there is no guarantee that the system can overwrite the exact physical region of the SSD where unencrypted clear text is written with encrypted data. Even if the system writes to every logical block, the system might still not be able to overwrite the block that contains the unencrypted clear text (as the actual physical size of the SSD can be larger than its logical size).

One solution to this problem involves activating encryption for the SSD and waiting for the system to complete encrypting the entire SSD before writing additional data onto the SSD. However, the encryption process can take hours or even days to complete, so this solution is very time-consuming and inconvenient. Another solution involves keeping track of writes to every single block, and whether each block is encrypted or unencrypted. For a typical system, a single block can contain 4 KB (where 1 KB=1024 bytes), so this solution would involve keeping track of every 4 KB block. In particular, the system would keep track of whether the write is performed on an encrypted block or on an unencrypted block. When the system reads data from the single block at a later time, the system determines whether the block is encrypted or unencrypted. If the block is encrypted, the system unencrypts the data and returns the unencrypted data. If the block is unencrypted, the system returns the raw data, which is unencrypted. Unfortunately, using a 4 KB block can result in a very large mapping table (e.g., 1 terabyte contains $10^9$ KB, or roughly $2.5 \times 10^8$ 4 KB blocks). Moreover, a large number of writes and reads associated with the mapping table over a period of time can result in a complicated mapping table that requires considerable overhead to implement.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
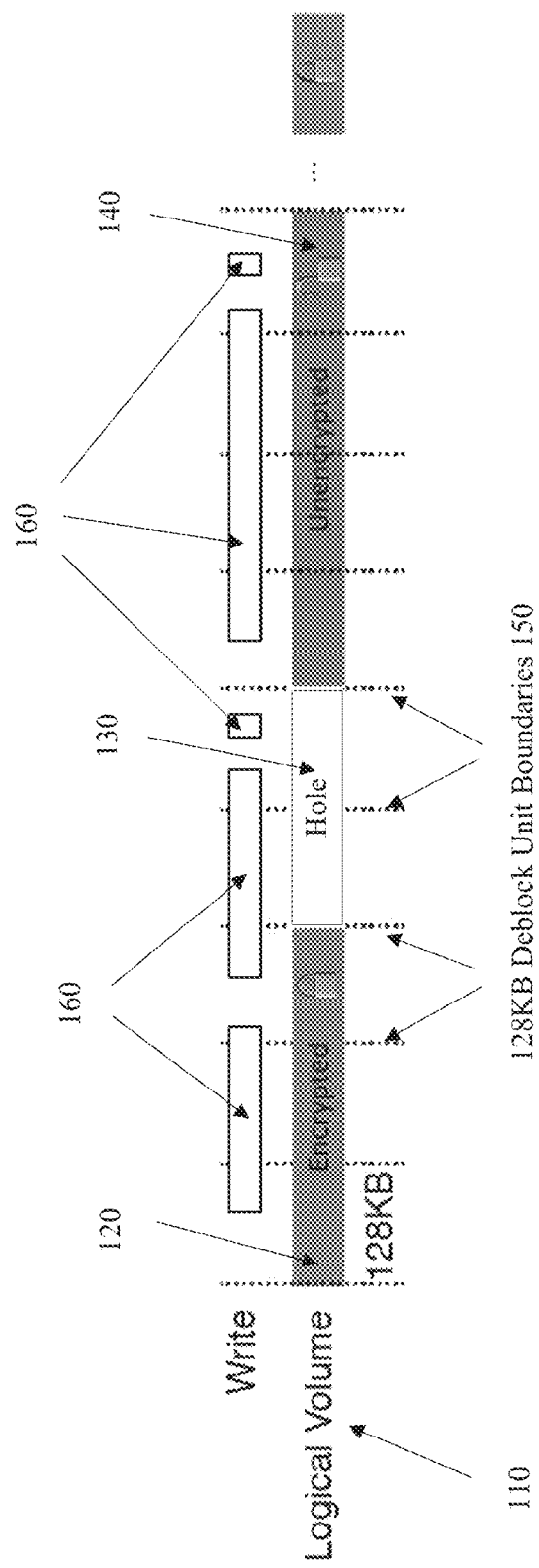
FIG. 1 shows examples of various types of Input/Output (I/O) updates (e.g., writes) on an SSD, where the SSD includes an encrypted region, a "hole" region, and an unencrypted region, in accordance with some example embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A first approach for encrypting data stored on a SSD (sold-state drive) includes: 1) activating encryption for the SSD, and 2) waiting for the system to complete encrypting the entire SSD before writing a first file onto the SSD. This approach for encrypting data stored on the SSD is time-consuming. A second approach for encrypting data stored on the SSD involves keeping track of every single block, where the block size is relatively small, (for example, 4 KB per block). However, this approach produces a considerably large mapping table (e.g., 1 terabyte contains $10^9$ KB, or roughly $2.5 \times 10^8$ 4 KB blocks), which can be inefficient. Accordingly, the embodiments set forth herein provide various techniques for optimizing the encryption of data on the SSD and ensuring that the encryption is performed in a secure manner without data loss or data corruption.

According to one embodiment, and to achieve the foregoing techniques, the system is configured to track block units of a larger size (e.g., larger than 4 KB), thereby making the size of the mapping table manageable. In one embodiment, a single block unit can be 128 KB, which corresponds to thirty-two (32) 4 KB blocks. In some implementations, when a small portion of a single block unit is to be updated, the system is configured to make changes to the entire block unit (i.e., the system updates data associated with the entire block unit). In other words, if a single block unit is 128 KB and only 6 KB of data (which is much less than 128 KB) is to be updated, the system still updates the entire 128 KB block unit. Thus, updates are made to entire block units regardless of the size of data that is to be written/updated. When encryption is activated for the SSD, data is encrypted prior to being written to the SSD.

In some implementations, the system receives a request to update at least a portion of a block unit. The request includes identifying information (such as location information, or other identifying information) for the block unit on a logical volume. Based on the identifying information and the mapping table, a corresponding block unit on a physical volume is located. The system reads data from the corresponding block unit on the physical volume into a RAM (random-access memory) or an in-memory buffer. Then, the system performs the requested update (i.e., makes the requested changes to the data in the RAM or in-memory buffer). Next, the system encrypts the data associated with the block unit in the RAM or in-memory buffer. Ideally, the system writes the encrypted data back onto the original corresponding block unit on the physical volume. However, since the system, in actual operation, can be updating multiple block units, the system cannot guarantee an atomic update across multiple block units. The system may, at most, be able to guarantee an atomic update for one block unit. Atomicity is one of the ACID (Atomicity, Consistency, Isolation, Durability) transaction properties associated with a storage system (for example, a database system). In an atomic transaction, a series of database operations either all occur, or nothing occurs. A guarantee of atomicity prevents updates to the database from occurring only partially, which can cause greater problems than rejecting the entire series of database operations. In other words, atomicity means indivisibility and irreducibility. In order to guarantee an atomic update across multiple block units, the system writes the encrypted data onto a new block unit on the physical volume. After the encrypted data has been written to the new block unit, the mapping layer or mapping table (that maps the logical blocks to the physical blocks) is updated to redirect the mapping to the new block unit on the physical volume.

In accordance with the foregoing, by having larger block units, the size of the mapping table is reduced. Also, since the system updates multiple block units at the same time, the system writes the encrypted data (from the buffer) to a new physical location (different from the original physical location), and then atomically switches them into place. At a later time, when the system has fully converted (i.e., encrypted) the entire SSD, the actual order of block units on the SSD can be jumbled. As the system writes to the SSD, the locations of the block units are moved. In other words, the fully encrypted SSD appears as a "shuffled" disk where the order of the block units on the disk is obfuscated as the system writes the encrypted data to the SSD. Therefore, in order to rearrange the block units, the SSD is defragmented. The defragmentation process rearranges the block units in order of a physical offset on the SSD such that the block units are arranged into one physical extent on the SSD. After the defragmentation process, the data on the SSD is encrypted and the mapping table is simplified. Since only one extent exists, the SSD can be reverted to the original file system format. The reverting process includes 1) deactivating the encryption for the SSD, and 2) returning the SSD to the original file system format.

Accordingly, various embodiments describe a novel approach for encrypting data stored on the SSD that resolves the problem of having unencrypted data remaining hidden in the SSD. A more detailed discussion of these techniques is set forth below and described in conjunction with FIGS. 1-7, which illustrate detailed diagrams of systems and methods that can be used to implement these techniques.

An SSD can internally maintain an SSD mapping table that maps a logical volume to a physical volume. In one aspect, a logical volume can be treated as a sequence of chunks called logical extents. In a further aspect, a logical extent can be treated as a specific number of contiguous logical blocks (or data blocks) allocated for storing a specific type of information. Similarly, a physical volume can be treated as a sequence of chunks called physical extents, and a physical extent can be treated as a specific number of contiguous physical blocks allocated for storing a specific type of information. Accordingly, the SSD mapping table can also map a logical extent to a physical extent, and a logical block to a physical block.

As previously described herein, an SSD mapping table can map a logical extent to a physical extent on the SSD. For each logical extent, the SSD mapping table can record whether the extent is encrypted or unencrypted. If a mapping of a logical extent to a physical extent does not exist in the SSD mapping table, then that logical extent is referred to as a "hole." Therefore, for a new file system where no mapping exists in the SSD mapping table, the entire logical volume is a "hole" that contains no data. In some implementations, one or more logical regions (e.g., logical extents/logical blocks) of the SSD (referred to as "unencrypted logical regions") might contain unencrypted data, while one or more other logical regions of the SSD (referred to as "encrypted logical regions") might contain encrypted data.

FIG. 1 depicts a logical volume 110 with three different logical extents. Specifically, logical extent 120 is encrypted, logical extent 130 is a "hole", and logical extent 140 is unencrypted. The three logical extents 120, 130, and 140 are aligned with one or more deblock units. In FIG. 1, a deblock unit refers to a block unit having a predetermined block size of 128 KB, but other values of a deblock unit can also selected. In one embodiment, the size of a deblock unit can be selected to be a multiple of 4 KB. The logical extents 120, 130, and 140 are illustrated as being aligned along the dashed lines of FIG. 1, which correspond to the deblock unit boundaries 150. It will be appreciated that in order to avoid clutter on FIG. 1, only some of the deblock unit boundaries 150 are labeled. FIG. 1 further shows various I/O (input/output) requests 160 to update various portions/regions of the logical volume 110.

The various types of I/O requests 160 shown in FIG. 1 are processed based on: (1) whether the update is to be performed on blocks that are allocated (i.e., not a "hole") or non-allocated (i.e., a "hole"), (2) whether the update is to be performed on blocks that are encrypted or unencrypted, and (3) whether the update is to be performed on blocks that are aligned or not aligned with a deblock unit. When an I/O request (e.g., a write request) is received, the system determines whether the write request is for 1) one or more allocated (or non-allocated) blocks, 2) one or more encrypted (or unencrypted blocks), and 3) one or more blocks that are aligned (or not aligned) to the deblock unit. In some implementations, when the write request is received, the system determines a manner in which the write request is to be processed based on a type of logical region for which the write request is received. For instance, the write request is processed differently based on whether the logical region is an encrypted region 120, a "hole" region 130, or an unencrypted region 140. FIGS. 2A-2E depict the processing of the I/O requests 160 based on the determinations made by the system.

Figure 2A:
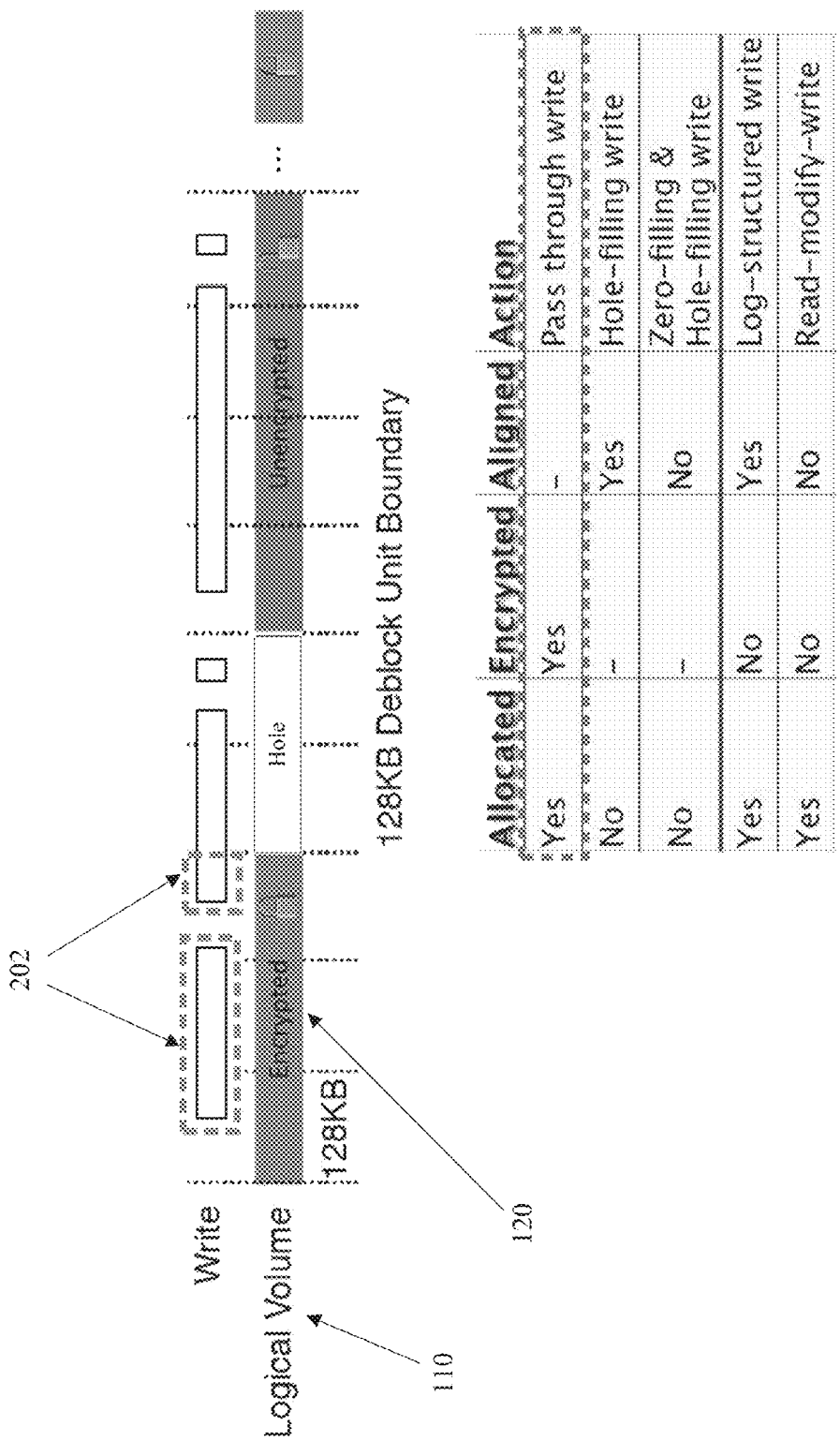
FIG. 2A shows examples of I/O updates on an encrypted region of an SSD, and an embodiment method for processing these writes in the SSD, in accordance with some example embodiments.

FIG. 2A illustrates an exemplary I/O request (e.g., a write request 202) for an encrypted region 120 of an SSD. FIG. 2A depicts processing the write request 202 for the encrypted region 120 of the SSD, in accordance with some example embodiments. In this case, the system determines that the write request is for the encrypted region 120 of the logical volume 110. In other words, the system determines that the write request is to be performed on one or more allocated (non-"hole") and encrypted blocks. In response to the determination, the system performs a pass-through write operation. In the pass-through write operation, the system allows the I/O request (i.e., write request that includes data to be written to the encrypted region 120) to pass through to the encrypted region 120. In some implementations, the system allows the write request that updates data on the encrypted region 120 of the SSD to pass through. The system encrypts the data associated with the write request and writes the encrypted data to one or more extents/blocks of the encrypted region 120 of the SSD. In this scenario, no change to the SSD mapping table is necessary.

Figure 2B:
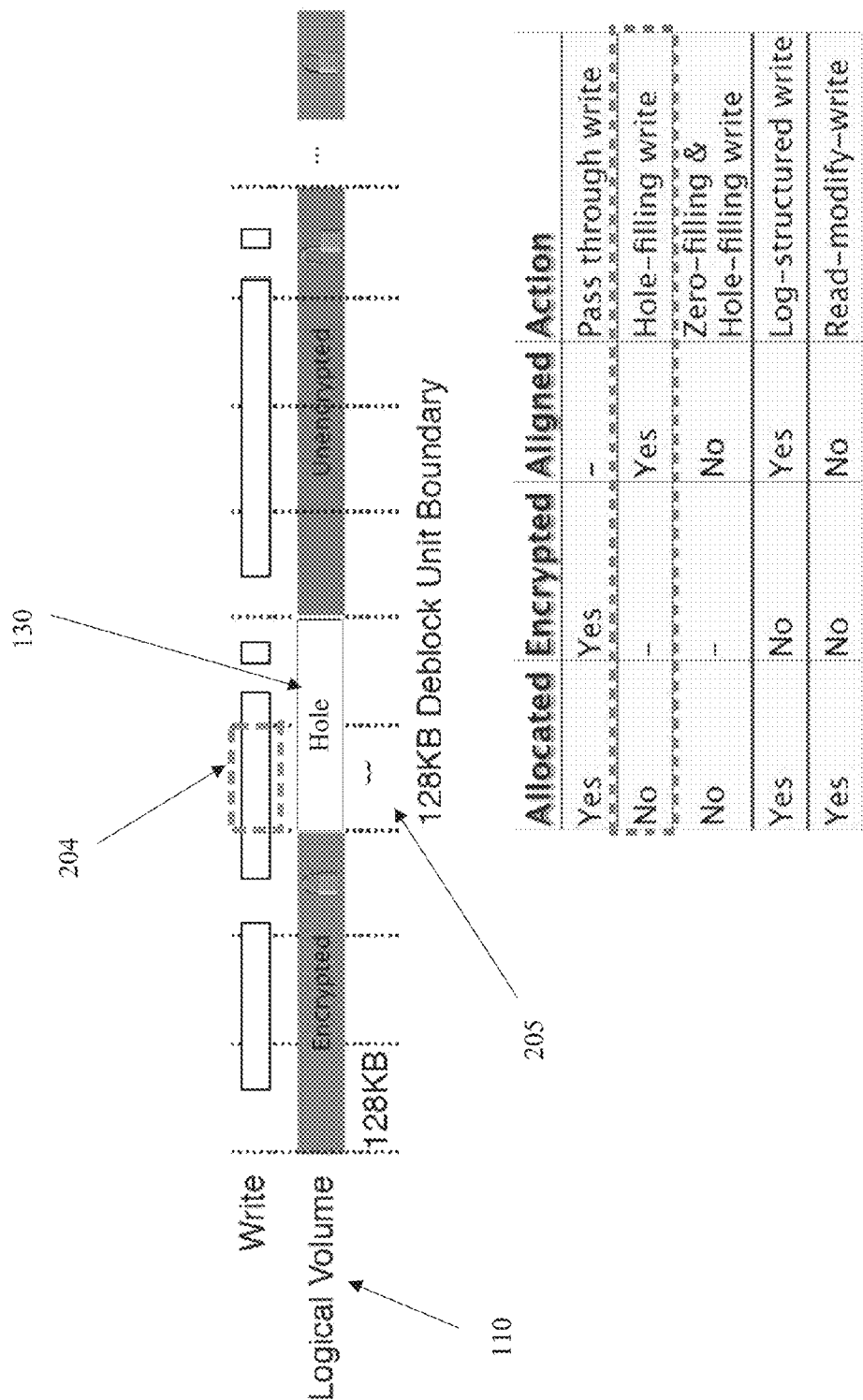
FIG. 2B shows an example of an I/O update on a "hole" region of an SSD that is aligned with a 128 KB deblock unit, and an embodiment method for processing the write in the SSD, in accordance with some example embodiments.

FIG. 2B illustrates an exemplary I/O request (e.g., a write request 204) on a "hole" region 130 of an SSD, wherein the write request 204 is aligned with a 128 KB deblock unit 205. In other words, the write request 204 is to be performed on logical blocks (of the "hole" region 130) that are aligned with the deblock unit 205. FIG. 2B depicts processing the write request 204 for the "hole" region 130 of the SSD, in accordance with some example embodiments. In this case, the system determines that the write request 204 is for the "hole" region 130 of the logical volume 110 and the write request 204 is aligned with the deblock unit 205. In other words, the system determines that the write request 204 is to be performed on a non-allocated block that is equal to and aligned with the deblock unit 205. In response to the determination, the system performs a "hole"-filling write operation. In the "hole"-filling write operation, the system allows the write request 204 that writes data on at least an extent/block of the "hole" region 130 that aligns with the deblock unit 205 to pass through. The system encrypts the data associated with the write request 204 and writes the encrypted data to the extent/block of the "hole" region 130 that aligns with the deblock unit 205. The system marks that extent/block of the "hole" region 130 as encrypted. To keep the mapping table small, the granularity in each write request is at least the block unit size.

Figure 2C:
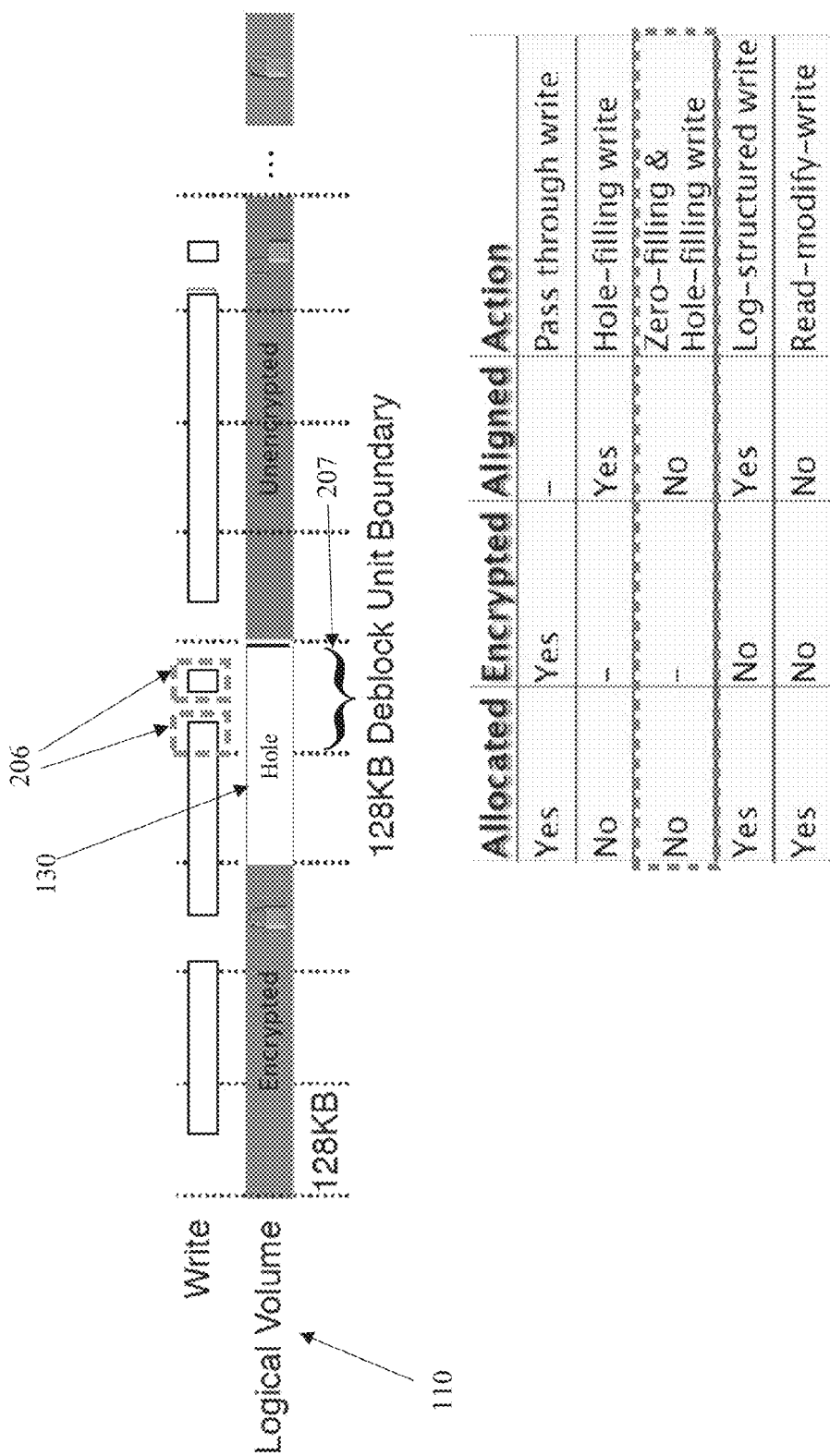
FIG. 2C shows examples of I/O updates on a "hole" region of an SSD that is not aligned with a 128 KB deblock unit, and an embodiment method for processing the writes in the SSD, in accordance with some example embodiments.

FIG. 2C illustrates exemplary I/O request (e.g., write request 206) on a "hole" region 130 of an SSD, wherein the write request 206 is not aligned with a 128 KB deblock unit 207. In other words, the write request 206 is to be performed on logical blocks (of the "hole" region 130) that are not aligned with the deblock unit 207. FIG. 2C depicts processing the write request 206 for the "hole" region 130 of the SSD, in accordance with some example embodiments. In this case, the system determines that 1) the write request 206 is for the "hole" region 130 of the logical volume 110, and 2) the write request 206 is not aligned with the deblock unit 207. In other words, the system determines that the write request 206 is to be performed on a non-allocated block that is not aligned with the deblock unit 207. Therefore, the data associated with the write request 206 cannot be simply encrypted and written onto the extent/block (that is aligned with the deblock unit 207) in the "hole" region 130. If the write request 206 is written and the 128 KB extent is marked as encrypted, some sensitive data can leak (e.g., contents of deleted files). In order to avoid this leakage, a zero-fill operation is performed for the portions of the 128 KB extent/block that do not have the write request 206 associated therewith. After the zeroes are filled in, the write request 206 is aligned with the deblock unit 207. Therefore, the system generates a new write request and performs a "hole"-filling write operation. The new write request includes the original data from the write request 206 and zeroes for the portions of the 128 KB extent/block that do not have the associated write request 206. The system encrypts the data associated with the new write request (original data of the write request 206 plus the zeroes) and writes the encrypted data to the 128 KB extent/block of the "hole" region 130 that aligns with the deblock unit 207. The system marks the extent/block of "hole" region 130 as encrypted. The system does not mark any region as being encrypted unless every single block in the region has been filled with zeroes or encrypted with an encryption key.

Figure 2D:
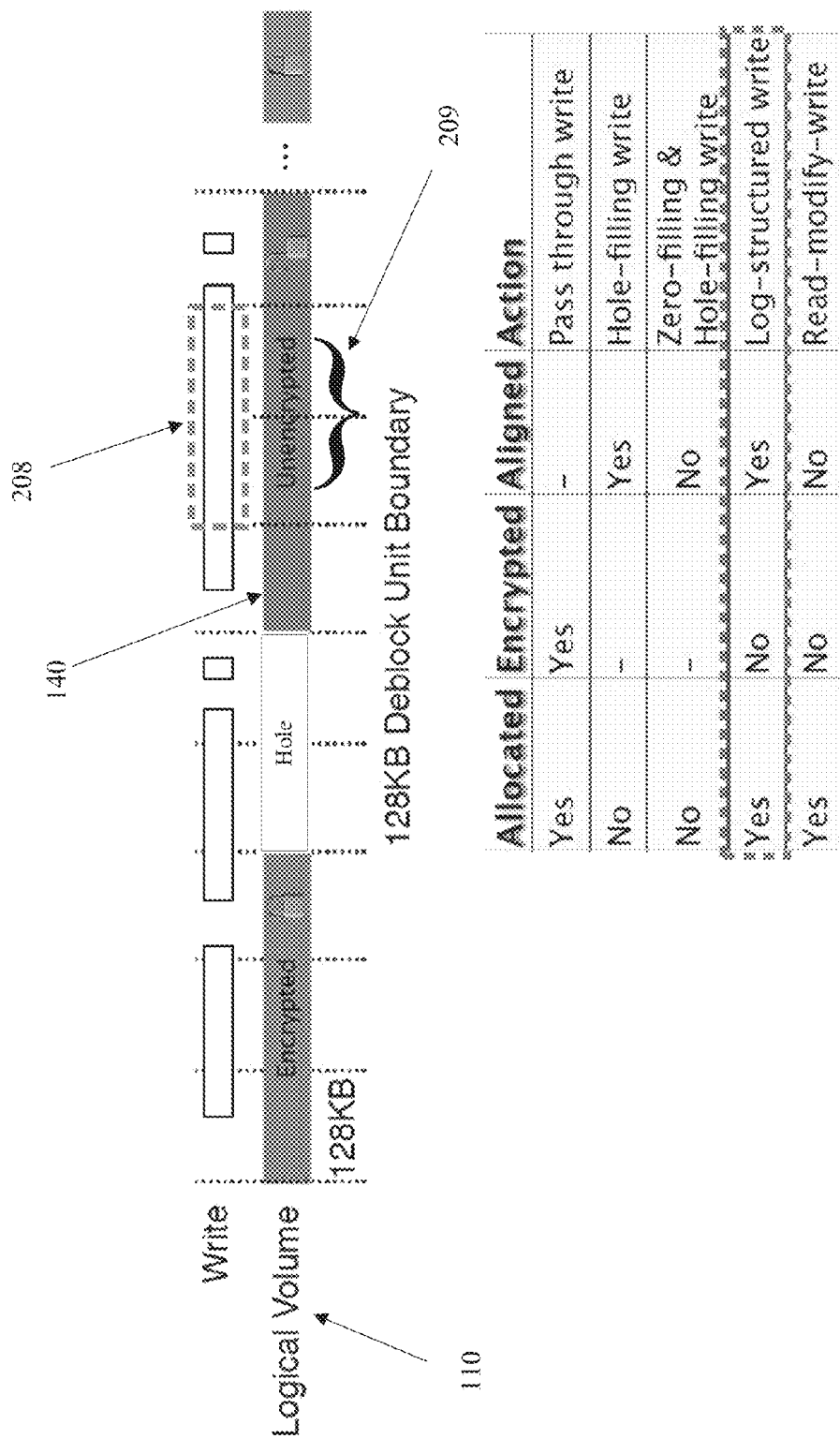
FIG. 2D shows an example of an I/O update on an unencrypted region of an SSD that is aligned with a 128 KB deblock unit, and an embodiment method for processing the write in the SSD, in accordance with some example embodiments.

FIG. 2D illustrates an exemplary I/O request (e.g., a write request 208) on an unencrypted region 140 of an SSD, wherein the write request 208 is aligned with one or more 128 KB deblock units 209. In other words, the write request 208 is to be performed on logical blocks (of the unencrypted region 140) that are aligned with one or more deblock units 209. FIG. 2D depicts processing the write request 208 for the unencrypted region 140 of the SSD, in accordance with some example embodiments. In this case, the system determines that the write request 208 is for the unencrypted region 140 of the logical volume 110 and the write request 208 is aligned with one or more deblock units 209. In other words, the system determines that the write request 208 is to be performed on one or more allocated and unencrypted blocks that are aligned with the one or more deblock units 209 in the unencrypted region 140 of the SSD. In response to the determination, a log-structured write operation is performed. In the log-structured write operation, the data associated with the write request 208 is encrypted and written to a separate region (extents/blocks) of the SSD. The encrypted data is not directly overwritten onto the unencrypted region 140 but is written to the separate region of the SSD. This is done to avoid data corruption in case of a system crash. For example, if the system crashes while the data is being encrypted and overwritten onto the unencrypted region 140, only partially encrypted data will be present on the SSD when the system recovers from the crash. When the writing of encrypted data onto the separate region is completed, the separate region is marked as encrypted.

Figure 2E:
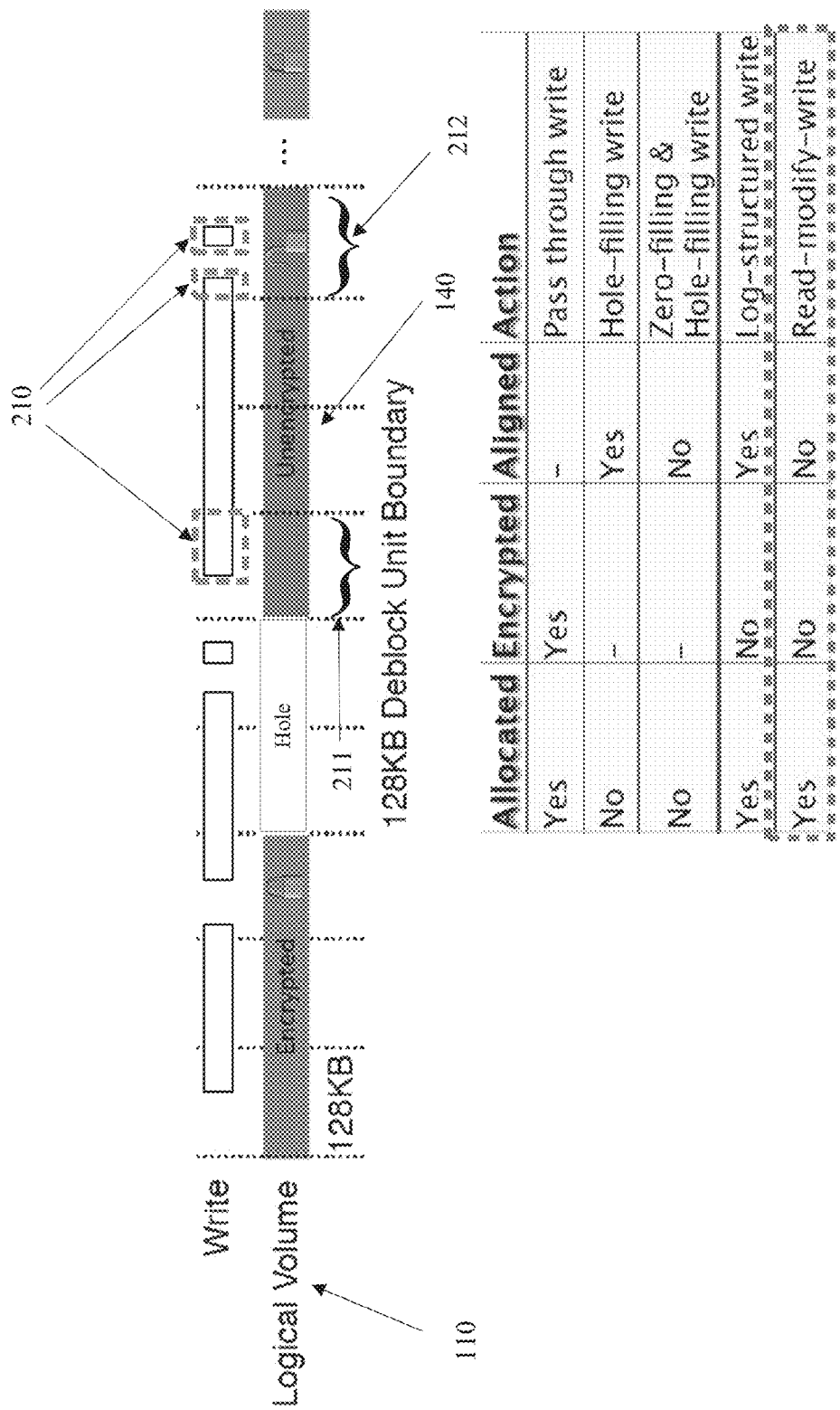
FIG. 2E shows examples of I/O updates on an unencrypted region of an SSD that is not aligned with a 128 KB deblock unit, and an embodiment method for processing the writes in the SSD, in accordance with some example embodiments.

FIG. 2E illustrates an exemplary I/O request (e.g., a write request 210) on an unencrypted region 140 of an SSD, wherein the write request 210 is not aligned with one or more 128 KB deblock units 211, 212. In other words, the write request 210 is to be performed on logical blocks (of the unencrypted region 140) that are not aligned with the one or more deblock units 211, 212. FIG. 2E depicts processing the write request 210 for the unencrypted region 140 in the SSD, in accordance with some example embodiments. In this case, the system determines that the write request 210 is 1) for the unencrypted region 140 of the logical volume 110, and 2) the write request 210 is not aligned with the one or more deblock units 211, 212. In other words, the system determines that the write request 210 is to be performed on one or more allocated and unencrypted blocks that are not aligned with the one or more deblock units 211, 212 in the unencrypted region 140 of the SSD. In response to the determination, a "read-modify-write" operation is performed. The "read-modify-write" operation is explained in more detail in conjunction with FIGS. 3 and 4A-4H.

Figure 3:
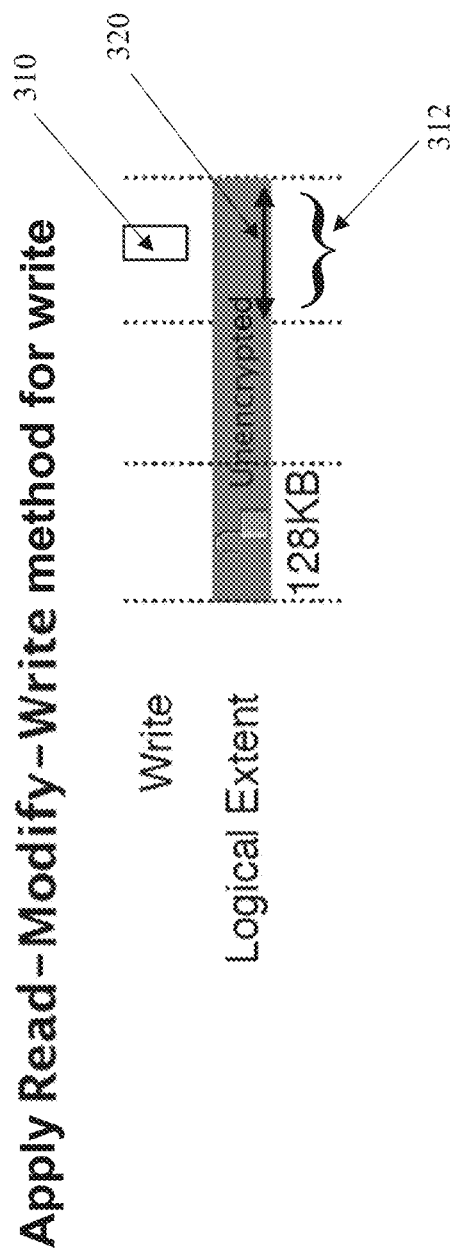
FIG. 3 shows an example of a write on an unencrypted region of an SSD that is not aligned with a 128 KB block, in accordance with some example embodiments.

FIG. 3 shows an example of a write request 310 for an unencrypted region of an SSD. As shown in FIG. 3, the write request 310 is not aligned with a 128 KB deblock unit 312 (i.e., the write request 310 does not cover the entire deblock unit 312, but only a portion thereof), in accordance with some example embodiments. The write request 310 is to be performed in a logical extent 320 of a logical volume.

Figure 4A:
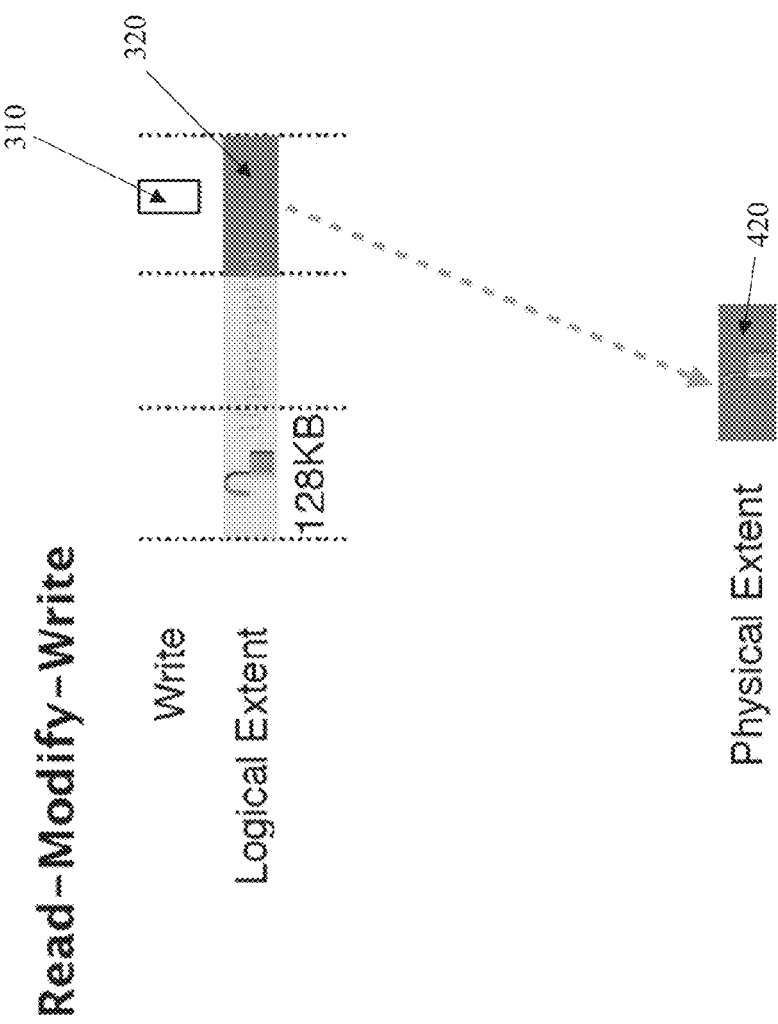
FIG. 4A shows a first step of a "read-modify-write" method that can be used to process the example write of FIG. 3, in accordance with some example embodiments. Specifically, in the first step, the method uses the mapping table to locate an original physical extent, which corresponds to the logical extent.
Figure 4B:
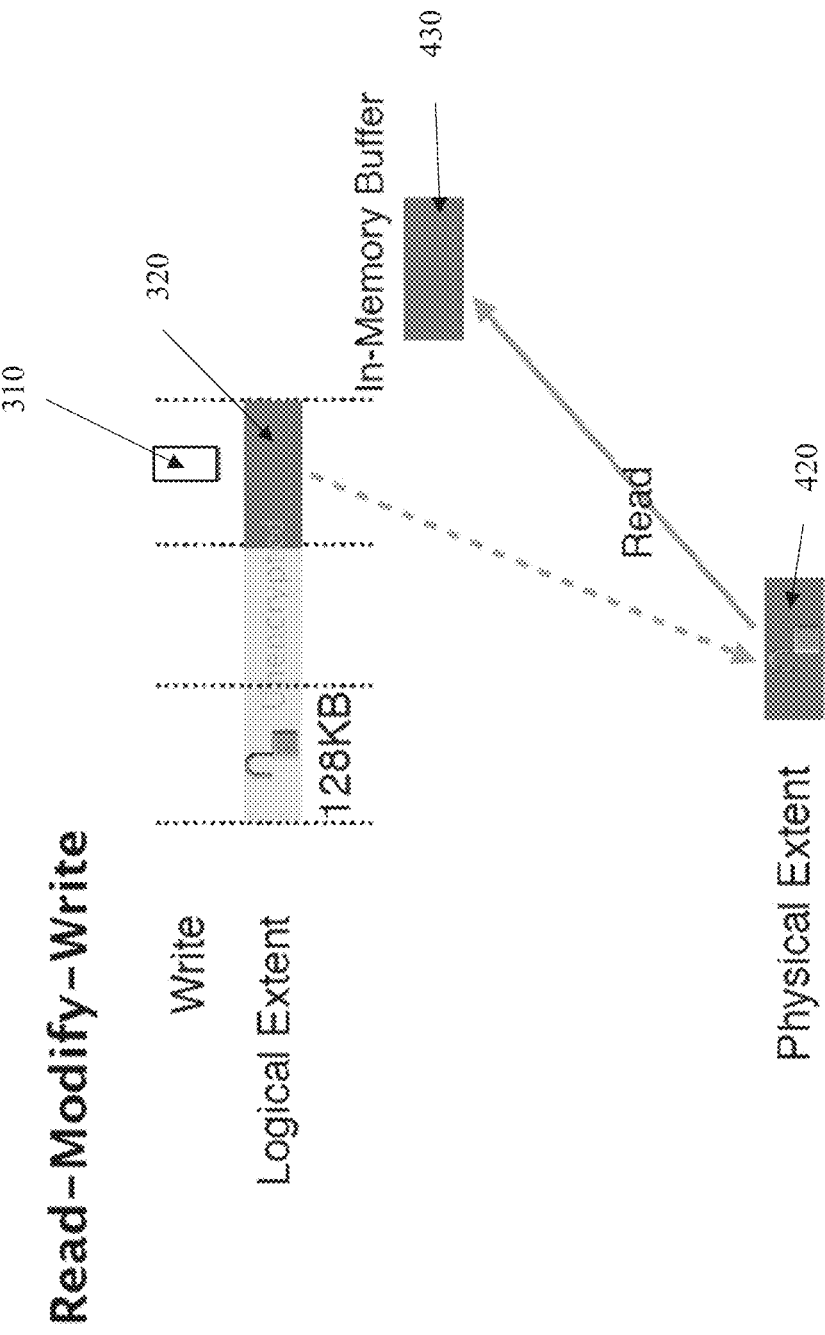
FIG. 4B shows a second step of a "read-modify-write" method that can be used to process the write from FIG. 3, in accordance with some example embodiments. Specifically, in the second step, the method reads and copies the corresponding original physical extent to an in-memory buffer.
Figure 4C:
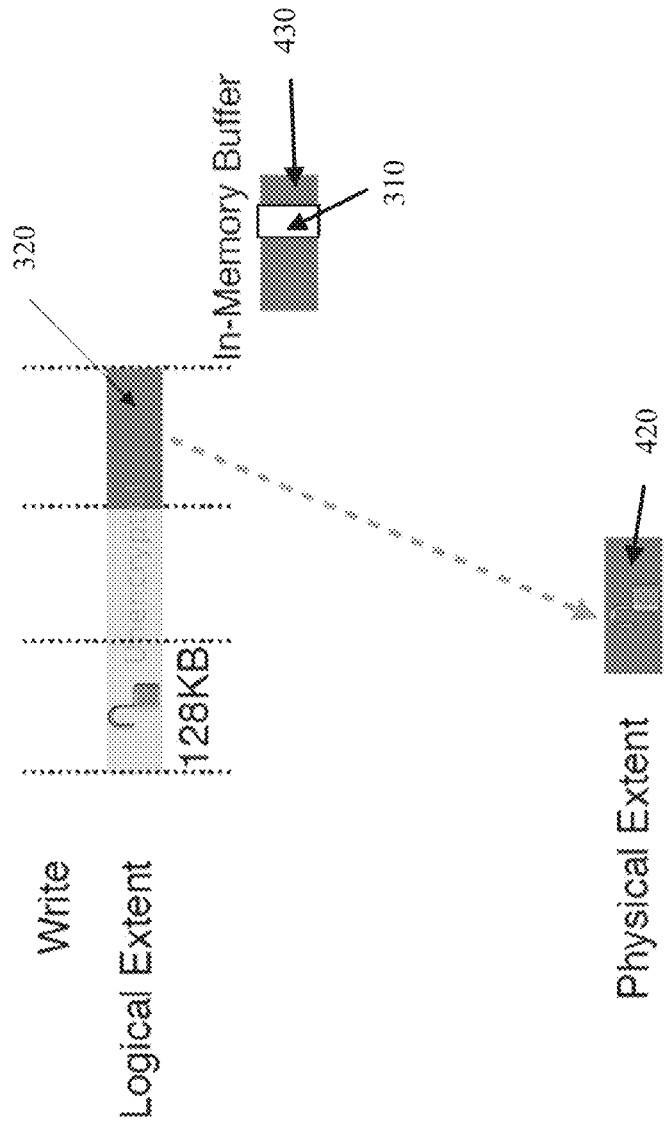
FIG. 4C shows a third step of a "read-modify-write" method that can be used to process the write from FIG. 3, in accordance with some example embodiments. Specifically, the method performs the write to the in-memory buffer.
Figure 4D:
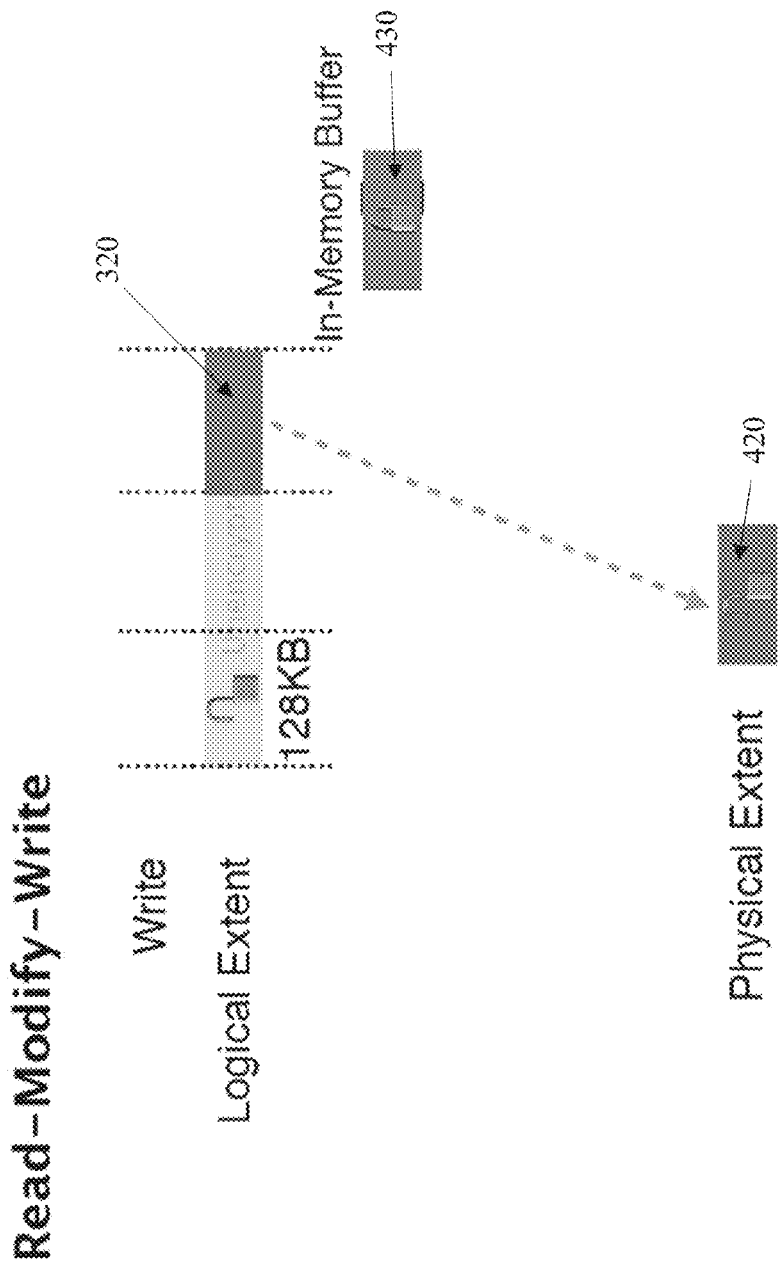
FIG. 4D shows a fourth step of a "read-modify-write" method that can be used to process the write from FIG. 3, in accordance with some example embodiments. Specifically, the method encrypts the content of the in-memory buffer, which now includes the write update.
Figure 4E:
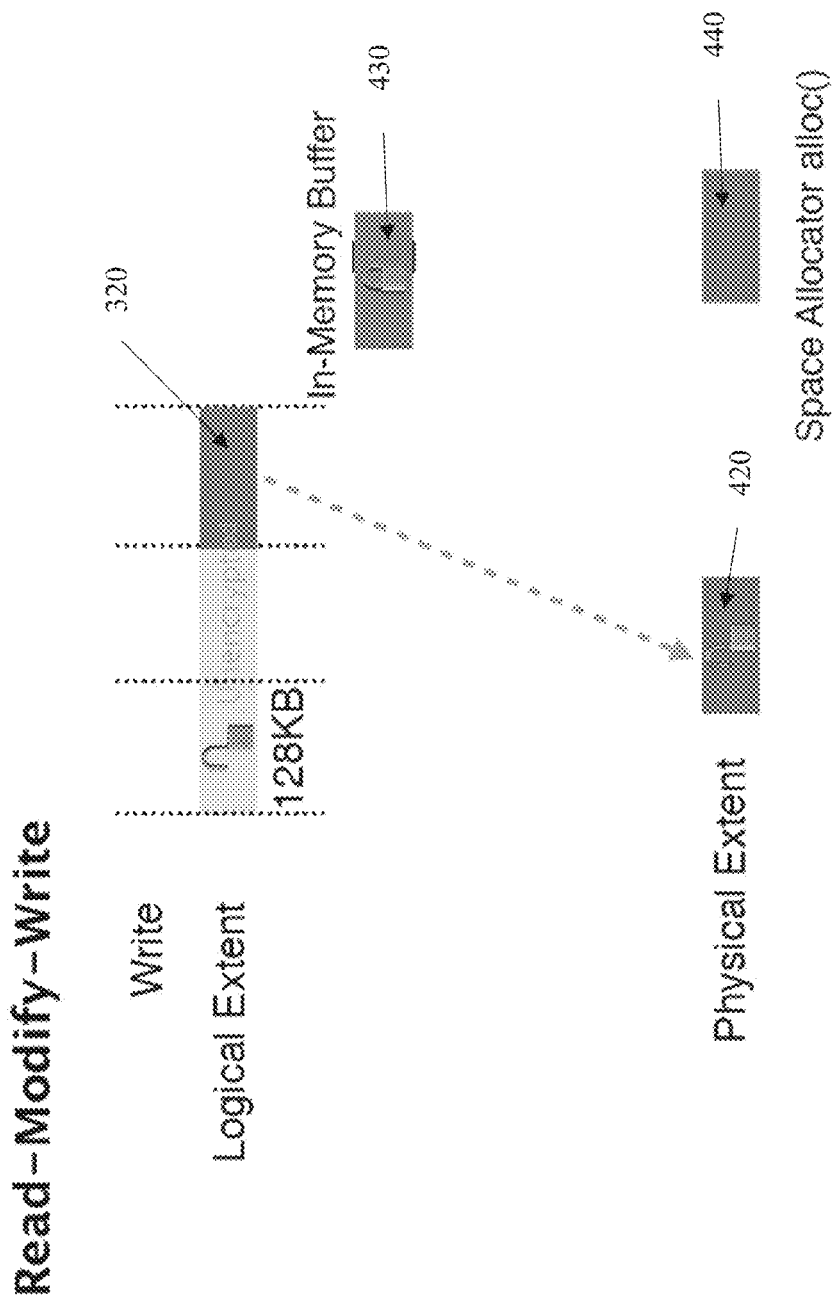
FIG. 4E shows a fifth step of a "read-modify-write" method that can be used to process the write from FIG. 3, in accordance with some example embodiments. Specifically, the method allocates a new physical extent for writing the content of the in-memory buffer.

FIG. 4A shows a first step of a "read-modify-write" method that can be used to process the write request 310 of FIG. 3. In the first step, the method uses the SSD mapping table to locate an original physical extent 420, which corresponds to the logical extent 320. FIG. 4B shows a second step of the "read-modify-write" method that can be used to process the write request 310 of FIG. 3. In the second step, the method reads and copies data from the corresponding original physical extent 420 to an in-memory buffer 430. The entire content of physical extent 420 is copied to the in-memory buffer 430. FIG. 4C shows a third step of the "read-modify-write" method that can be used to process the write request 310 of FIG. 3. In the third step, the method writes the data associated with the write request 310 to the in-memory buffer 430. In other words, the content of physical extent 420 is updated with data associated with the write request 310. FIG. 4D shows a fourth step of a "read-modify-write" method that can be used to process the write request 310 of FIG. 3. In the fourth step, the method encrypts the content of the in-memory buffer 430, which includes the updated data. FIG. 4E shows a fifth step of a "read-modify-write" method that can be used to process the write request 310 of FIG. 3. In the fifth step, the method allocates a new physical extent 440 for writing the content of the in-memory buffer 430. The new physical extent 440 is a free space on the physical volume and is allocated by calling a space allocator function. The method writes the encrypted data from the in-memory buffer 430 to the new physical extent 440 (not to the old physical extent 420), in order to avoid data corruption that may result from a system crash.

Figure 4F:
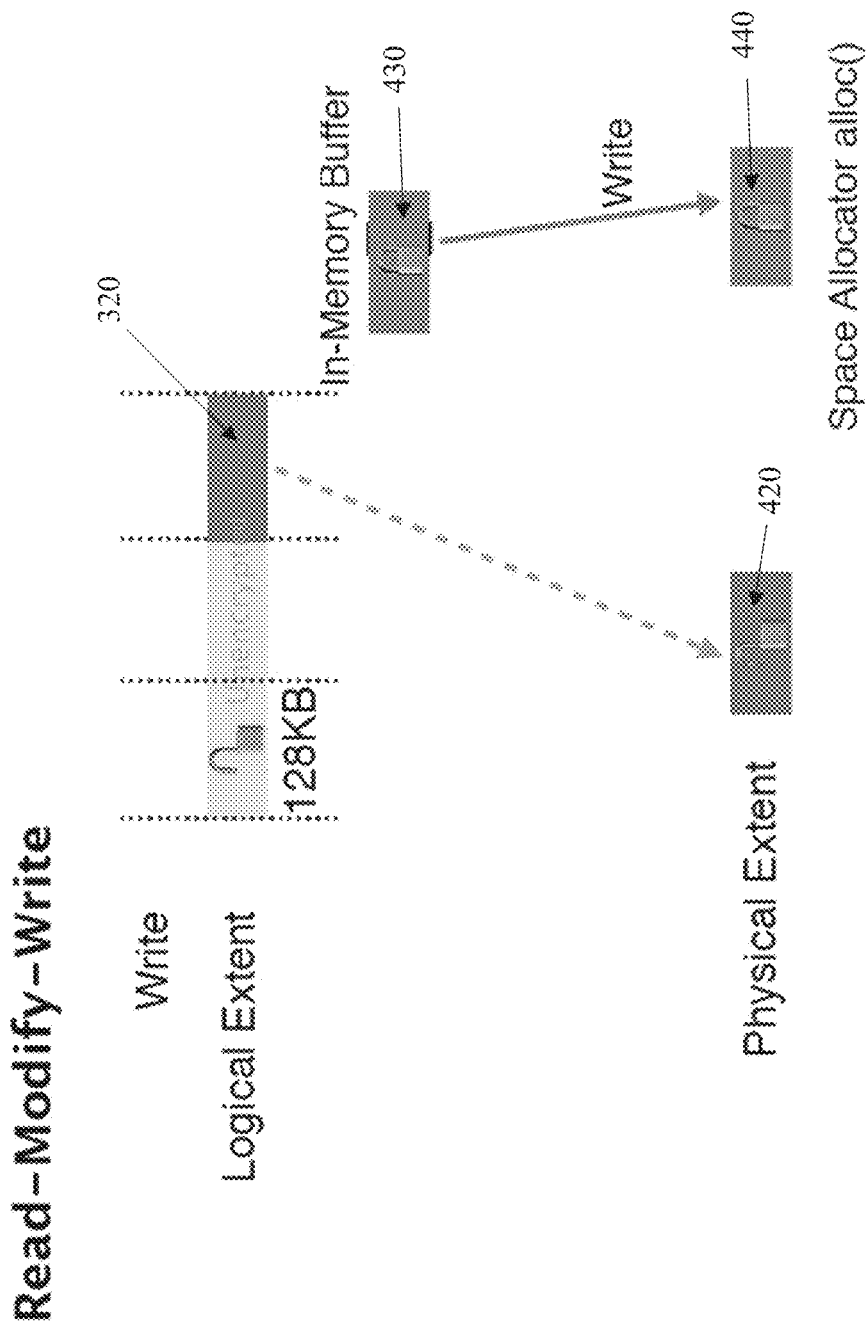
FIG. 4F shows a sixth step of a "read-modify-write" method that can be used to process the write from FIG. 3, in accordance with some example embodiments. Specifically, the method writes the content of the in-memory buffer into the new physical extent.
Figure 4G:
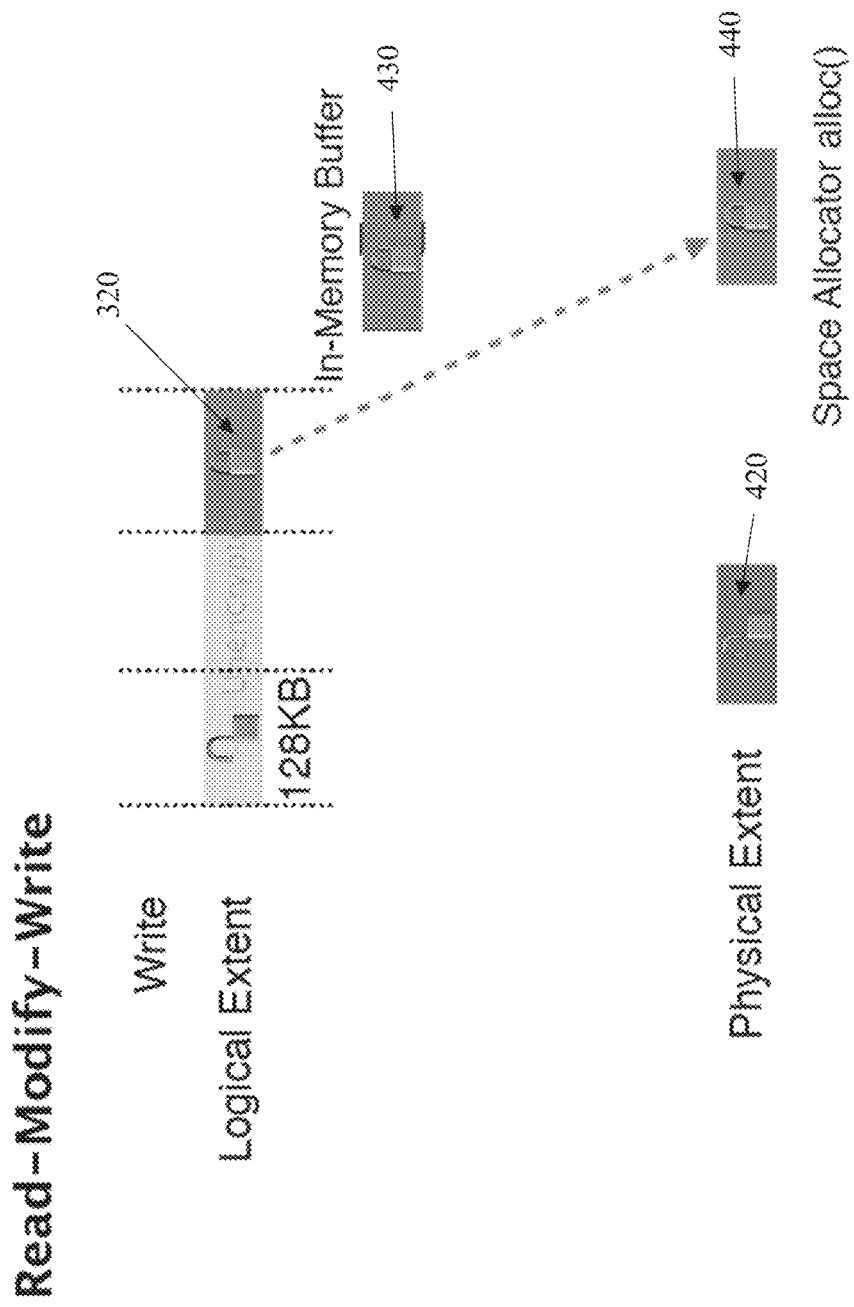
FIG. 4G shows a seventh step of a "read-modify-write" method that can be used to process the write from FIG. 3, in accordance with some example embodiments. Specifically, the method re-maps the logical extent to the new physical extent.

FIG. 4F shows a sixth step of a "read-modify-write" method that can be used to process the write request 310 of FIG. 3. In the sixth step, the method writes the encrypted data from the in-memory buffer 430 into the new physical extent 440. However, in one embodiment, this transaction (involving writing the encrypted data from the in-memory buffer 430 into the new physical extent 440) might still only be in memory and not yet be saved onto disk (i.e., the SSD). Specifically, the transaction will not be carried out until a commit is performed. The content in the in-memory buffer 430 and the content to be saved (or already saved) into the new physical extent 440 are both encrypted. FIG. 4G shows a seventh step of a "read-modify-write" method that can be used to process the write request 310 of FIG. 3. In the seventh step, the method re-maps the logical extent 320 to the new physical extent 440. However, this re-mapping is only in memory and is not yet saved on disk.

Figure 4H:
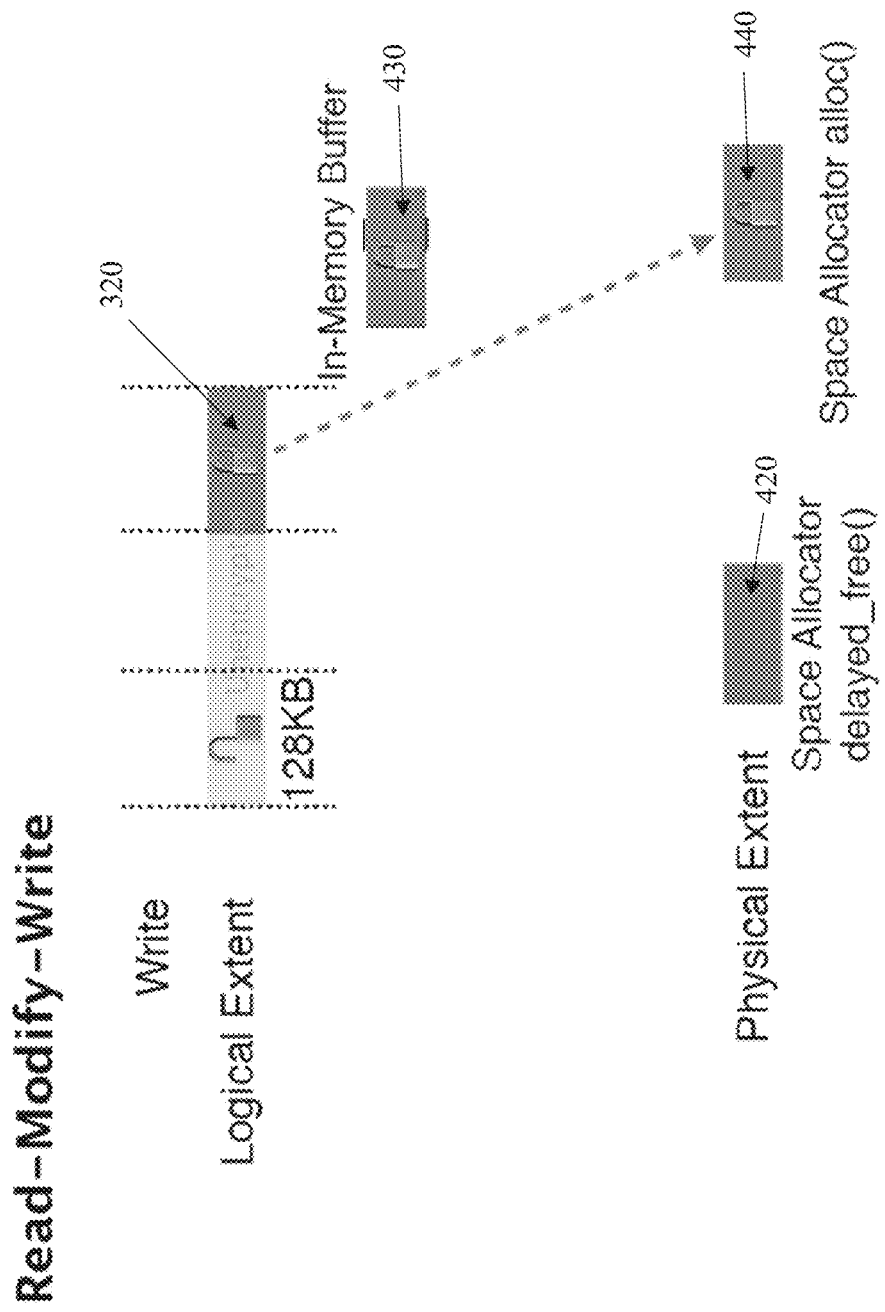
FIG. 4H shows an eighth step of a "read-modify-write" method that can be used to process the write from FIG. 3, in accordance with some example embodiments. Specifically, the method frees the original physical extent for possible future allocation of data.

FIG. 4H shows an eighth step of a "read-modify-write" method that can be used to process the write request 310 of FIG. 3. In the eighth step, the method frees the space associated with the original physical extent 420. Specifically, the method calls a space allocator function for freeing the original physical extent 420. By performing the space allocator function in memory, the physical extent 420 is freed, but cannot yet be re-used by the system. In other words, the physical extent 420 will be free on the disk after commit, but, before the commit, physical extent 420 cannot be updated to hold any new data. The freeing of the space is delayed (i.e., freed after commit) to avoid data corruption in case of a system crash. If a system crash occurs while the "read-modify-write" operation is being performed, then logical extent 320 will still map to physical extent 420. If the physical extent were to be allowed to be updated with new data during this time, data can become corrupted.

To have all the changes described in FIG. 4A-4H saved to disk, a commit is performed. Therefore, when the commit is performed, the following changes are made: 1) a change to the mapping table, 2) saving of the content of the new physical extent 440 on disk, and 3) freeing of the physical extent 420 on disk. All these changes are protected by the transaction system, such that either all these changes appear after reboot following a system crash, or no changes appear after the reboot. In other words, the logical extent will either point to the new physical extent (i.e., all changes were executed) or the old physical extent (i.e., no changes were executed). This guarantees that the SSD will always be in a consistent state.

As multiple writes are performed and the mapping redirected to new physical locations when the writes are performed, a shuffle is carried out against the order of the blocks on the SSD. Generally, the deblock unit is large enough so the shuffling does not affect the performance of the SSD. In some cases, however, the shuffling can affect the performance of the SSD, especially if the SSD has inferior performance capabilities. Additionally, if the SSD is shuffled, the SSD cannot be reverted (i.e., deactivating data encryption and returning the SSD to the original file system format). Therefore, defragmenting the SSD to rearrange order of the SSD blocks can have advantages of supporting optimal performance, the ability to revert, and reduction of memory usage.

Figure 5A:
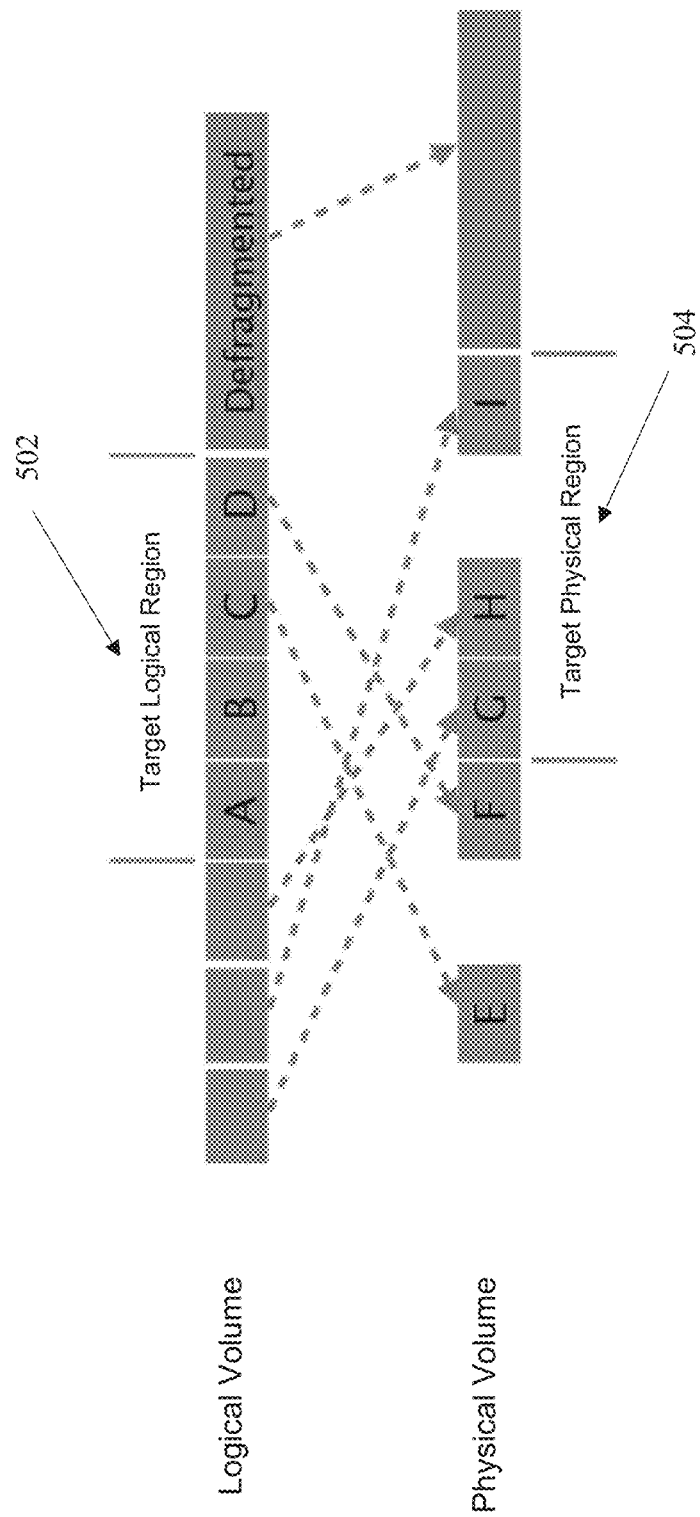
FIG. 5A shows a first step of an example method for defragmenting a physical volume, in accordance with some example embodiments. Specifically, the method selects a target logical region and a target physical region for defragmenting.

The defragmenting process begins from the end of the physical volume and works backward (i.e., to the beginning of the physical volume), as shown in FIG. 5A. For every logical block, the defragmenting process determines the address (i.e., location on the physical volume) of the corresponding physical block. If the address of the corresponding physical block is already in the right order, then the defragmenting process proceeds to the next logical block. FIG. 5A shows a first step of an example method for defragmenting the physical volume. The method begins by selecting a target logical region 502 and a target physical region 504 for defragmenting, in accordance with some example embodiments. In the first step, the method selects a target logical region 502, a target physical region 504, and sets a defragmentation pointer at these regions. As can be seen in FIG. 5A, the blocks in the target physical region 504 are not in the right order, so the defragmenting process moves the unordered blocks G, H, and I from the target physical region 504 to a separate space 506 on the physical volume.

Figure 5B:
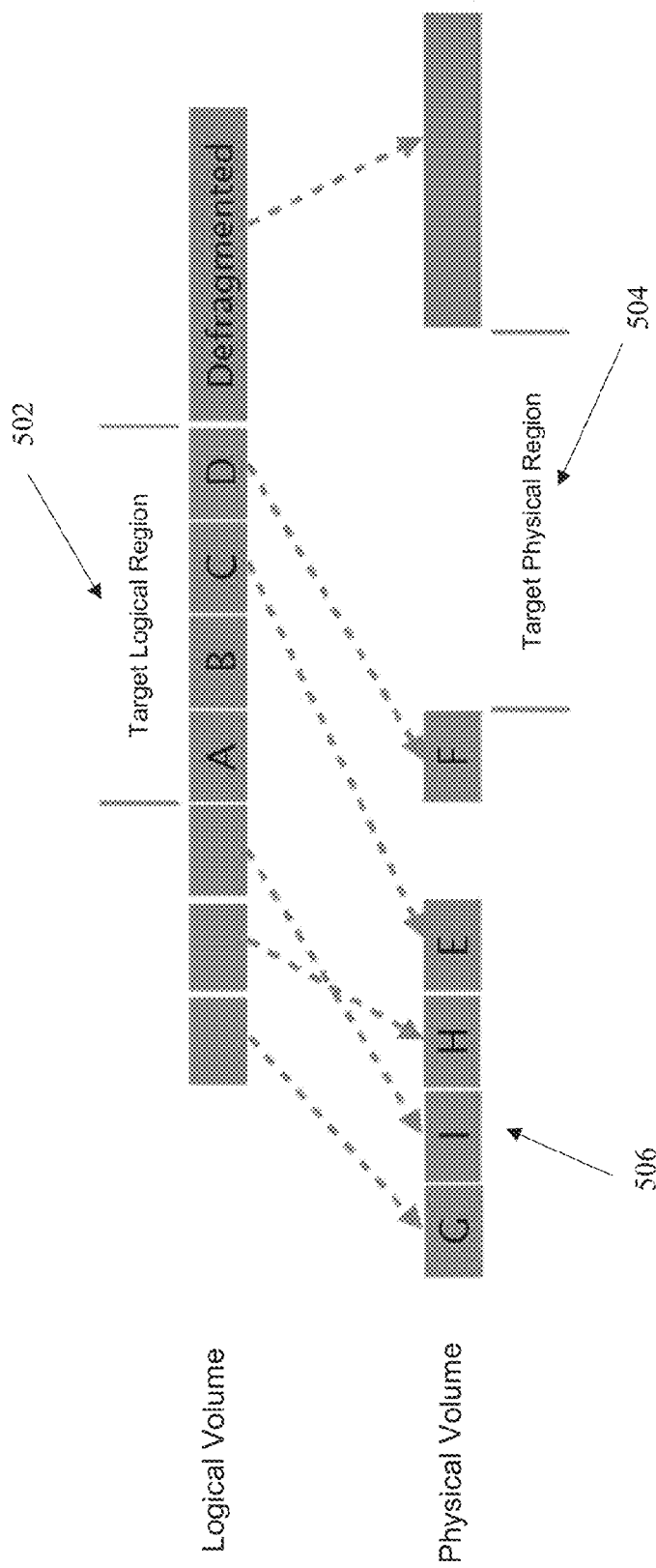
FIG. 5B shows a second step of an example method for defragmenting the physical volume, in accordance with some example embodiments. Specifically, when the contents of the target physical region are not in the right order, the method moves the contents of the target physical region to free spaces that are outside the target physical region.
Figure 5C:
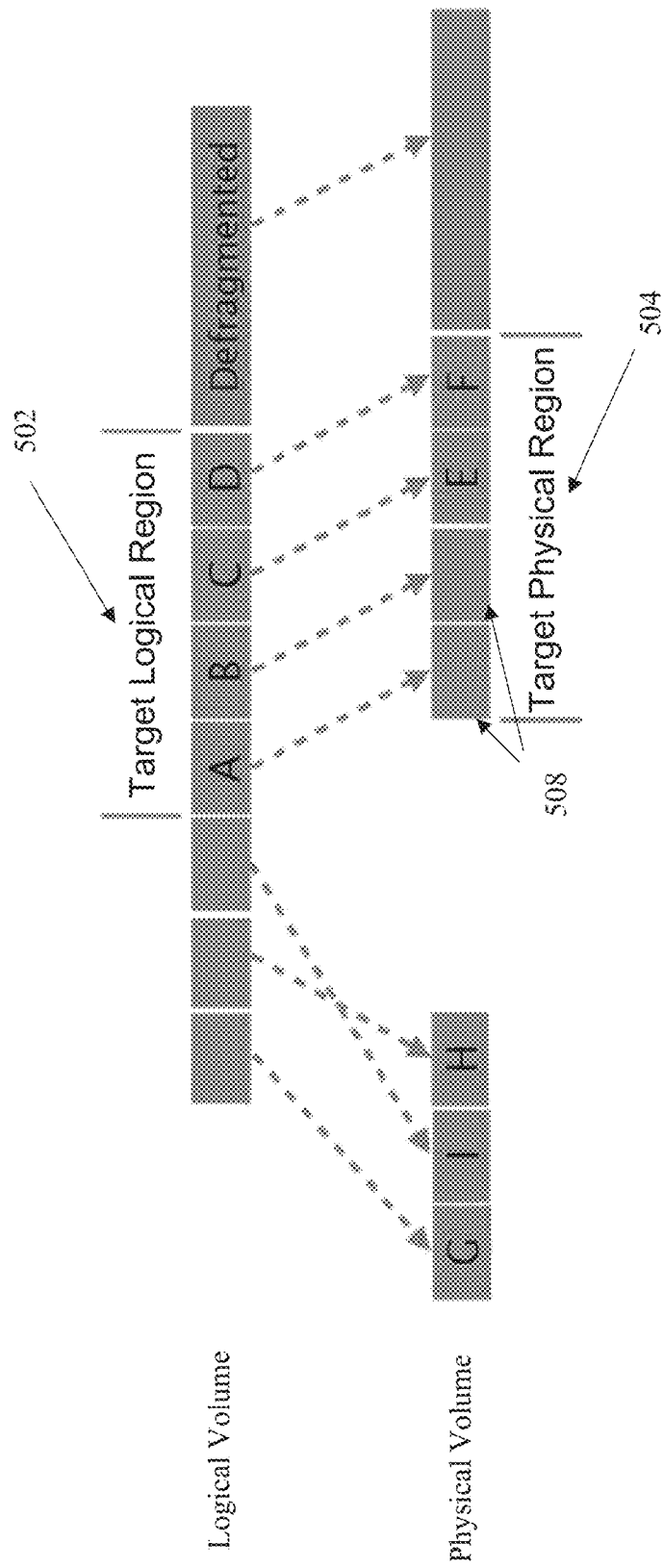
FIG. 5C shows a third step of an example method for defragmenting the physical volume, in accordance with some example embodiments. Specifically, the method moves all the contents on the physical volume that correspond to the target logical region to the target physical region, and fills any "holes."

FIG. 5B shows a second step of an example method for defragmenting the physical volume. In the second step, the content of unordered blocks is moved from the target physical region 504 to free spaces 506 that are outside and separate from the target physical region 504. In particular, the blocks G, H, and I are moved outside the target physical region. Then, the mapping table (that maps the logical volume to the physical volume) is updated. At this stage, the target physical region 504 is ready to accept new encrypted data. FIG. 5C shows a third step of an example method for defragmenting the physical volume. In the third step, the defragmenting process moves the content on the physical volume that corresponds to the target logical region 502 to the target physical region 504. As shown in FIG. 5C, the content moved into the target physical region 504 include the blocks E and F that correspond to the blocks C and D in the target logical region 502. The defragmenting process further fills any "holes" with zeroes. For example, two "holes" 508 in the target physical region 504 are filled. The two "holes" 508 indicate that the physical volume has no content corresponding to blocks A and B in the target logical region 502. Since the target physical region 504 is defragmented and contiguous, the target physical region 504 can be merged with a previously defragmented part of the physical volume.

Figure 5D:
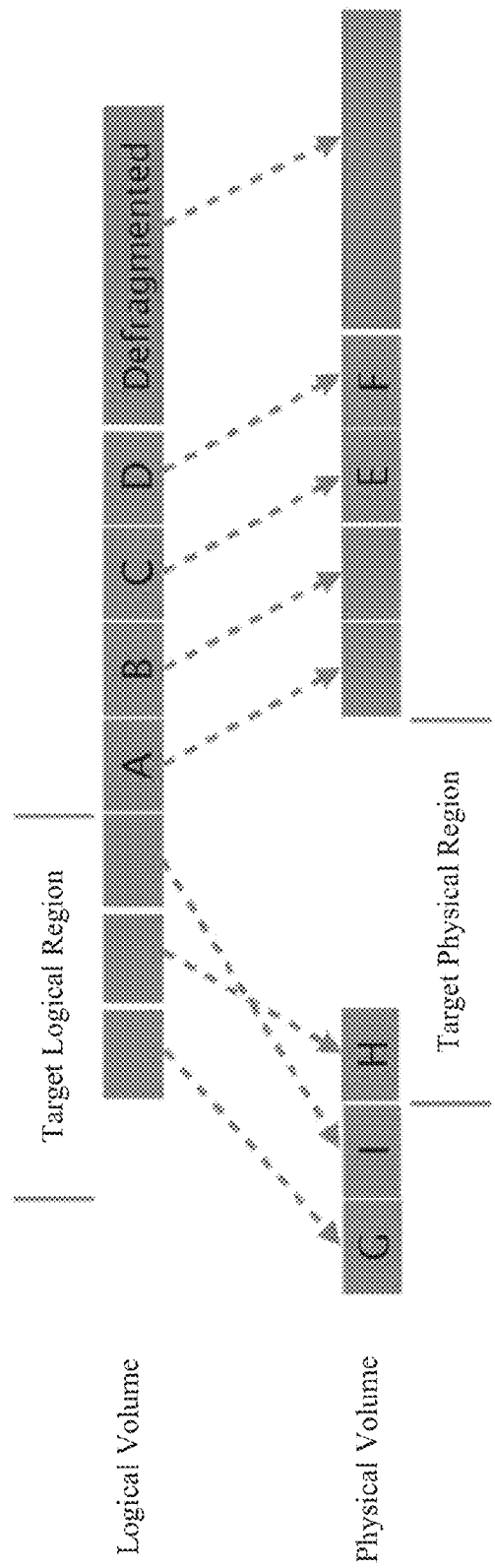
FIG. 5D shows a fourth step of an example method for defragmenting the physical volume, in accordance with some example embodiments. Specifically, the method moves to the next target logical region and the next target physical region for defragmenting.

FIG. 5D shows a fourth step of an example method for defragmenting the physical volume. In the fourth step, the defragmenting process moves the defragmentation pointer to the next target logical region and the next target physical region. Then the next target physical region is defragmented. The defragmenting process continues until the entire physical volume is defragmented.

Figure 6:
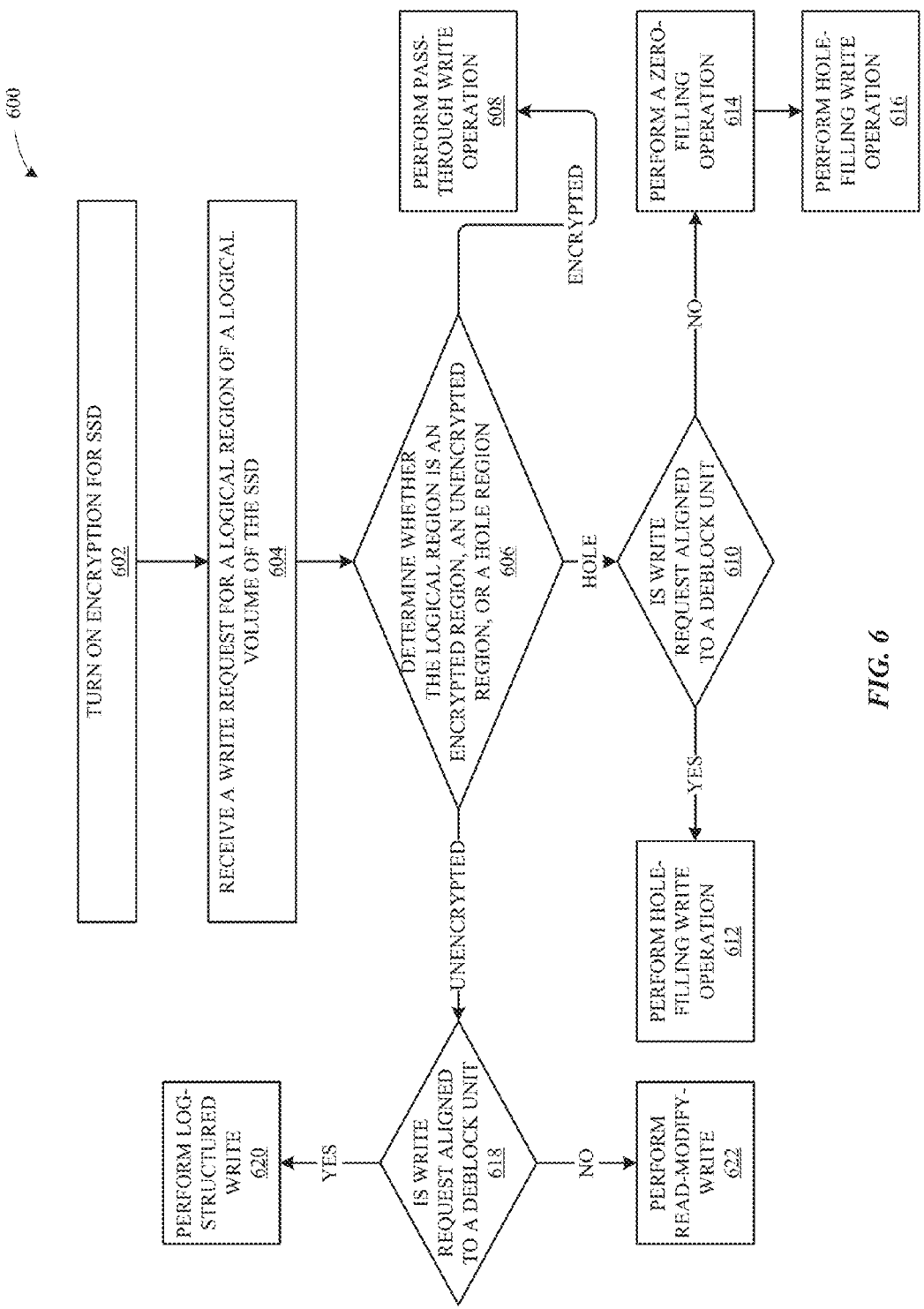
FIG. 6 illustrates an example method of encrypting data stored on the SSD, in accordance with some example embodiments.

FIG. 6 illustrates a sequence diagram of a method 600 for encrypting data stored on an SSD, according to some embodiments. As shown, the method 600 begins at step 602, where the system receives a request to activate encryption for the SSD. In response to the request, the system activates encryption for the SSD. At step 604, the system receives a write request for a logical region of a logical volume (e.g., one or more logical block units on the logical volume) of the SSD. The write request includes a request to update data associated with the logical region. The write request includes identifying information associated with the logical region for which the write request is received. Based on the identifying information and the SSD mapping table, a corresponding physical region (e.g., one or more physical block units on a physical volume of the SSD) is located.

In step 606, the system determines whether the logical region for which the write request is received is an encrypted region, an unencrypted region, or a "hole" region. In some implementations, the system utilizes the SSD mapping table to keep track of whether a particular a particular logical region is encrypted, unencrypted or a "hole." The system makes the determination regarding the type of logical region based on the SSD mapping table.

In some implementations, based on the determination regarding a type of logical region for which the write request is received, the system determines a manner in which the write request is to be processed. In response to a determination that the logical region is an encrypted region, a pass-through write operation is performed in step 608. In the pass-through write operation, the data associated with the write request is encrypted and the encrypted data is written to the encrypted region of the SSD. In particular, the system writes the encrypted data onto the corresponding physical region of the SSD.

In response to a determination that the logical region is a "hole" region, at step 610, a determination is made regarding whether the write request is aligned with a deblock unit. In response to a determination that the write request is aligned with the deblock unit, a "hole"-filling write operation is performed, in step 612. In the "hole"-filling write operation, the system encrypts the data associated with the write request and writes the encrypted data to the "hole" region. In particular, the system writes the encrypted data onto the corresponding physical region of the SSD.

In response to a determination that that the logical region is a "hole" region and the write request is not aligned with the deblock unit, at step 614, the system performs a zero-fill operation. In the zero-fill operation, the system fills zeroes for the portions of the "hole" region that do not have the write request associated therewith. In step 616, the system encrypts the data associated with the write request along with the zeroes and writes the encrypted data to the "hole" region. In particular, the system writes the encrypted data onto the corresponding physical region of the SSD.

In response to a determination that the logical region is an unencrypted region, at step 618, a determination is made regarding whether the write request is aligned with a deblock unit. In response to a determination that the write request is aligned with the deblock unit, at step 620, the system performs a log-structured write operation. In the log-structured write operation, the data associated with the write request is encrypted and the encrypted data is written at a separate region of the SSD (for example, a separate physical region and not the corresponding physical region of the SSD). In response to a determination that the write request is not aligned with the deblock unit, at step 622, the system performs a read-modify-write operation as described in FIGS. 4A-4H.

Figure 7:
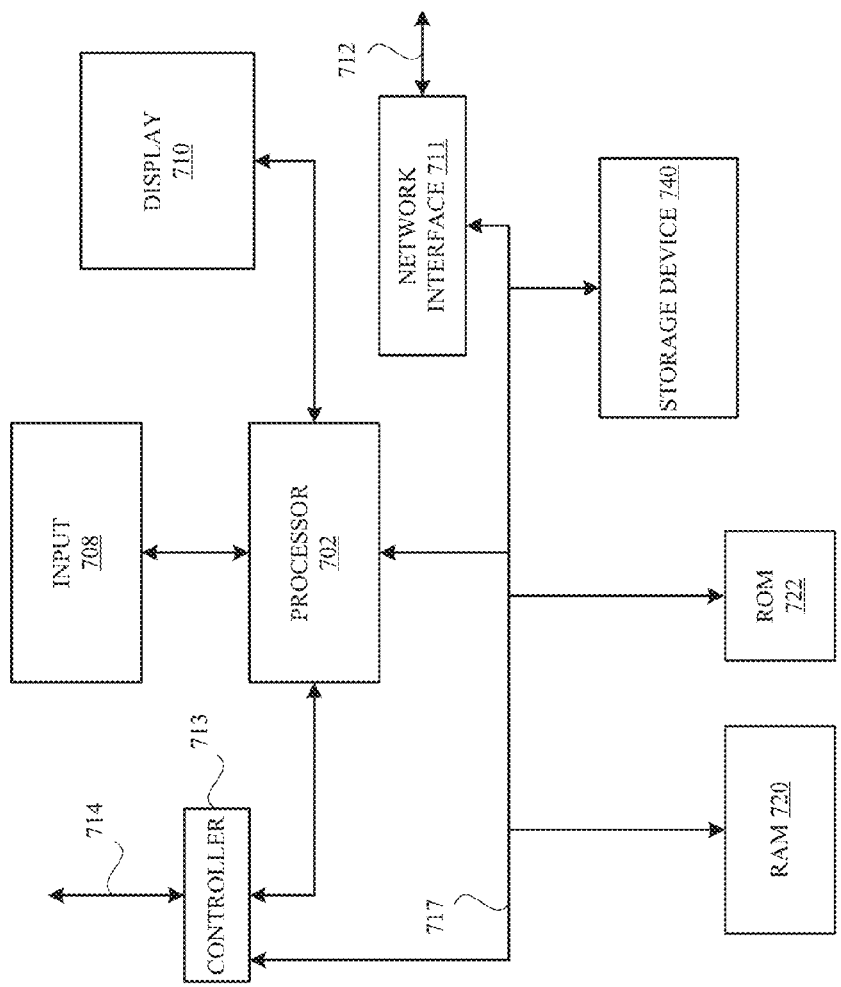
FIG. 7 illustrates a detailed view of a computing device that can be used to implement the various components described herein, in accordance with some example embodiments.

FIG. 7 illustrates a detailed view of a computing device 700 that can be used to implement the various components described herein, according to some embodiments. In particular, the detailed view illustrates various components that can be included in the system described herein. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 717 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., SSDs, hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for encrypting data stored on a solid-state drive (SSD), the method comprising:
    obtaining a mapping table associated with the SSD, wherein:
        the mapping table describes a plurality of logical volume extents,
        each logical volume extent corresponds to and is aligned with one or more deblock units; and
        each deblock unit corresponds to a different group of physical blocks of the SSD;

receiving a write request associated with target logical region information, wherein the target logical region information describes at least one target logical region that overlaps at least one logical volume extent described in the mapping table;

when the at least one logical volume extent is unallocated, and the at least one logical volume extent overlaps a boundary of at least one of the corresponding one or more deblock units:
processing the write request in conjunction with carrying out a zero-filling write operation and a hole-filling write operation; and when the at least one logical volume extent is unencrypted, and the at least one logical volume extent overlaps a boundary of at least one of the corresponding one or more deblock units:
processing the write request in conjunction with carrying out a read-modify-write operation.

2. The method of claim 1, further comprising, when the at least one logical volume extent is encrypted:
processing the write request, wherein processing the write request includes (i) encrypting data associated with the write request to produce encrypted data, and (ii) writing the encrypted data to the at least one target logical region.

3. The method of claim 1, further comprising, when the at least one logical volume extent is unallocated, and the at least one logical volume extent aligns with the boundaries of the corresponding one or more deblock units:
processing the write request in conjunction with carrying out a hole-filling write operation.

4. The method of claim 1, further comprising, when the at least one logical volume extent is unencrypted, and the at least one logical volume extent aligns with boundaries of the corresponding one or more deblock units:
processing the write request in conjunction with carrying out a log-structured write operation that comprises (i) encrypting data associated with the write request to produce encrypted data, and (ii) writing the encrypted data to different logical extent of the SSD.

5. The method of claim 1, wherein:
the zero-filling write operation comprises writing zeroes to the portions of the at least one logical volume extent that are not covered by at least one target logical region; and
the hole-filing write operation comprises encrypting data associated with the write request, and writing the encrypted data to the portions of the at least one logical volume extent that are covered by the at least one target logical region.

6. The method of claim 1, wherein the read-modify-write operation comprises:
reading data associated with the at least one target logical region into a buffer,
merging data associated with the write request with the data in the buffer to yield updated data,
encrypting the updated data,
allocating a new physical region within the SSD for writing the updated data, and
writing the updated data into the new physical region.

7. The method of claim 6, wherein the read-modify-write operation further comprises:
updating the mapping table to reflect the updated data.

8. The method of claim 6, wherein the read-modify-write operation further comprises freeing up the at least one target logical region.

9. The method of claim 6, wherein the read-modify-write operation further comprises performing a commit operation.

10. The method of claim 1, further comprising:
defragmenting the SSD.

11. At least one non-transitory computer readable storage medium configured to store instructions that, when executed by at least one processor included in a computing device, cause the computing device to encrypt data stored on a solid-state drive (SSD), by carrying out steps that include:
obtaining a mapping table associated with the SSD, wherein:
the mapping table describes a plurality of logical volume extents,
each logical volume extent corresponds to and is aligned with one or more deblock units, and
each deblock unit corresponds to a different group of physical blocks of the SSD;
receiving a write request associated with target logical region information, wherein the target logical region information describes at least one target logical region that overlaps at least one logical volume extent described in the mapping table;
when the at least one logical volume extent is unallocated, and the at least one logical volume extent overlaps a boundary of at least one of the corresponding one or more deblock units:
processing the write request in conjunction with carrying out a zero-filling write operation and a hole-filling write operation; and
when the at least one logical volume extent is unencrypted, and the at least one logical volume extent overlaps a boundary of at least one of the corresponding one or more deblock units:
processing the write request in conjunction with carrying out a read-modify-write operation.

12. The at least one non-transitory computer readable storage medium of claim 11, wherein the steps further include, when the at least one logical volume extent is unallocated, and the at least one logical volume extent aligns with the boundaries of the corresponding one or more deblock units:
processing the write request in conjunction with carrying out a hole-filling write operation.

13. The at least one non-transitory computer readable storage medium of claim 11, wherein the steps further include, when the at least one logical volume extent is unencrypted, and the at least one logical volume extent aligns with boundaries of the corresponding one or more deblock units:
processing the write request in conjunction with carrying out a log-structured write operation that comprises (i) encrypting data associated with the write request to produce encrypted data, and (ii) writing the encrypted data to different logical extent of the SSD.

14. The at least one non-transitory computer readable storage medium of claim 11, wherein:
the zero-filling write operation comprises writing zeroes to the portions of the at least one logical volume extent that are not covered by at least one target logical region; and
the hole-filing write operation comprises encrypting data associated with the write request, and writing the encrypted data to the portions of the at least one logical volume extent that are covered by the at least one target logical region.

15. The at least one non-transitory computer readable storage medium of claim 11, wherein the read-modify-write operation comprises:
    reading data associated with the at least one target logical region into a buffer,
    merging data associated with the write request with the data in the buffer to yield updated data,
    encrypting the updated data,
    allocating a new physical region within the SSD for writing the updated data, and
    writing the updated data into the new physical region.

16. A computing device configured to encrypt data stored on a solid-state drive (SSD), the computing device comprising at least one processor configured to cause the computing device to carry out steps that include:
    obtaining a mapping table associated with the SSD, wherein:
        the mapping table describes a plurality of logical volume extents,
        each logical volume extent corresponds to and is aligned with one or more deblock units, and
        each deblock unit corresponds to a different group of physical blocks of the SSD;
    receiving a write request associated with target logical region information, wherein the target logical region information describes at least one target logical region that overlaps at least one logical volume extent described in the mapping table;
    when the at least one logical volume extent is unallocated, and the at least one logical volume extent overlaps a boundary of at least one of the corresponding one or more deblock units:
        processing the write request in conjunction with carrying out a zero-filling write operation and a hole-filling write operation; and
    when the at least one logical volume extent is unencrypted, and the at least one logical volume extent overlaps a boundary of at least one of the corresponding one or more deblock units:
        processing the write request in conjunction with carrying out a read-modify-write operation.

17. The computing device of claim 16, wherein the steps further include, when the at least one logical volume extent is unallocated, and the at least one logical volume extent aligns with the boundaries of the corresponding one or more deblock units:
    processing the write request in conjunction with carrying out a hole-filling write operation.

18. The computing device of claim 16, wherein the steps further include, when the at least one logical volume extent is unencrypted, and the at least one logical volume extent aligns with boundaries of the corresponding one or more deblock units:
    processing the write request in conjunction with carrying out a log-structured write operation that comprises (i) encrypting data associated with the write request to produce encrypted data, and (ii) writing the encrypted data to different logical extent of the SSD.

19. The computing device of claim 16, wherein:
    the zero-filling write operation comprises writing zeroes to the portions of the at least one logical volume extent that are not covered by at least one target logical region; and
    the hole-filing write operation comprises encrypting data associated with the write request, and writing the encrypted data to the portions of the at least one logical volume extent that are covered by the at least one target logical region.

20. The computing device of claim 16, wherein the read-modify-write operation comprises:
    reading data associated with the at least one target logical region into a buffer,
    merging data associated with the write request with the data in the buffer to yield updated data,
    encrypting the updated data,
    allocating a new physical region within the SSD for writing the updated data, and
    writing the updated data into the new physical region.

\* \* \* \* \*